(12) United States Patent
Fortin et al.

(10) Patent No.: US 8,628,738 B2
(45) Date of Patent: Jan. 14, 2014

(54) BAYER PROCESS FOR PRODUCING ALUMINA TRIHYDRATE, SAID PROCESS COMPRISING A STEP IN WHICH THE SUPERSATURATED LIQUOR IS FILTERED AT HIGH TEMPERATURE BEFORE DECOMPOSITION

(75) Inventors: Luc Fortin, Chicoutimi (CA); Guy Forte, Jonquière (CA); Henri Thomas, Aix en Provence (FR); El Kadi Bassam, Aix en Provence (FR)

(73) Assignee: Rio Tinto Alcan International Limited, Montreal, Quebec (CA)

( * ) Notice: Subject to any disclaimer, the term of this patent is extended or adjusted under 35 U.S.C. 154(b) by 267 days.

(21) Appl. No.: 13/057,574

(22) PCT Filed: Jul. 29, 2009

(86) PCT No.: PCT/FR2009/000948
§ 371 (c)(1),
(2), (4) Date: Feb. 4, 2011

(87) PCT Pub. No.: WO2010/015738
PCT Pub. Date: Feb. 11, 2010

(65) Prior Publication Data
US 2011/0158868 A1    Jun. 30, 2011

(30) Foreign Application Priority Data
Aug. 6, 2008   (FR) ..................................... 08 04488

(51) Int. Cl.
*C01F 1/00* (2006.01)
(52) U.S. Cl.
USPC ........... 423/127; 423/121; 423/123; 423/122; 210/333.01
(58) Field of Classification Search
USPC .................. 423/127, 121, 123, 122
See application file for complete search history.

(56) References Cited

U.S. PATENT DOCUMENTS

| 4,221,666 | A | * | 9/1980 | Hedberg, Jr. | ................. 210/236 |
| 4,676,959 | A |   | 6/1987 | The et al. | |
| 4,789,474 | A | * | 12/1988 | Gaudfrin | ................. 210/333.01 |
| 5,407,561 | A |   | 4/1995 | Iida et al. | |
| 5,628,972 | A | * | 5/1997 | Deville et al. | ................. 423/121 |
| 7,807,119 | B2 | * | 10/2010 | Rousseaux et al. | ........... 423/121 |

FOREIGN PATENT DOCUMENTS

| AU | 2004280272 B2 | 8/2009 |
| FR | 2728556 A | 6/1996 |
| FR | 2860782 A | 4/2005 |
| WO | 2007/115365 A | 10/2007 |

OTHER PUBLICATIONS

International Search Report and Written Opinion mailed Feb. 9, 2010 (PCT/FR2009/000948); ISA/EP.

* cited by examiner

*Primary Examiner* — Melvin C Mayes
*Assistant Examiner* — Melissa Stalder
(74) *Attorney, Agent, or Firm* — Banner & Witcoff, Ltd.

(57) ABSTRACT

Process for manufacturing alumina trihydrate by alkaline attack of bauxite, following the general steps of the Bayer process, and during which, after settling and before decomposition, the aluminate liquor undergoes a filtration, known as security filtration, so that at the end of the filtration it contains less than 10 mg/l of insoluble particles, characterized in that, during said security filtration, a filtration device is used that comprises a zone in which the liquor is subjected, after passing through said filtration media, to a pressure greater than 2 bar, preferably greater than 3 bar. Preferably, this device also comprises a zone in which the liquor is subjected, before passing through the filtration media, to a pressure greater than 5 bar, preferably greater than 6, typically in the vicinity of 7 bar. In this way, the aluminate liquor can be kept at a high temperature during the security filtration, typically greater than 130° C., preferably greater than 140° C., and be brought to a high degree of supersaturation Rp, typically greater than 1.25, without risk of reversion.

26 Claims, 1 Drawing Sheet

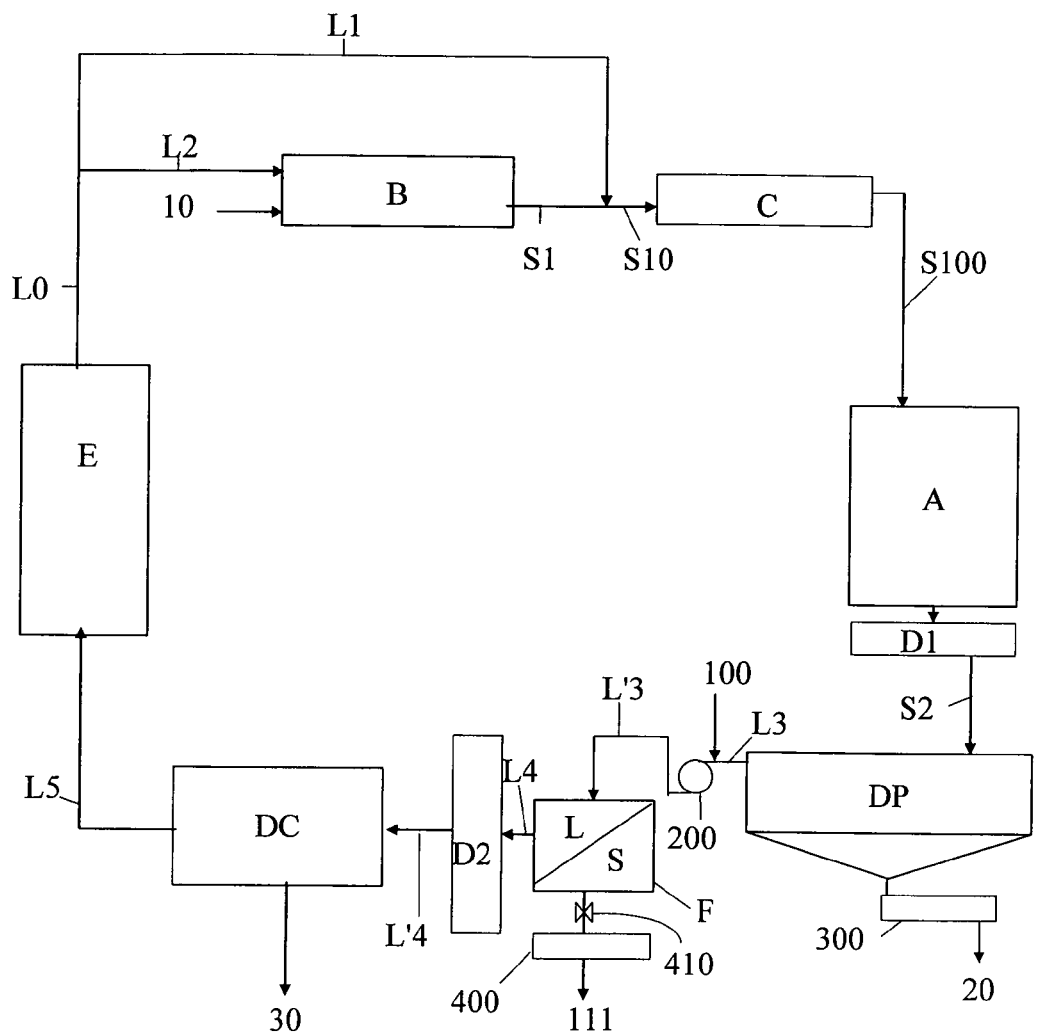
Figure

BAYER PROCESS FOR PRODUCING ALUMINA TRIHYDRATE, SAID PROCESS COMPRISING A STEP IN WHICH THE SUPERSATURATED LIQUOR IS FILTERED AT HIGH TEMPERATURE BEFORE DECOMPOSITION

CROSS-REFERENCE TO RELATED APPLICATIONS

The present application is a U.S. National Phase filing of International Application No. PCT/FR2009/000948 filed on Jul. 29, 2009, designating the United States of America and claiming priority to France patent application Ser. No. 08/04488, filed on Aug. 6, 2008, both of which applications the present application claims priority to and the benefit of, and both of which applications are incorporated by reference herein in their entireties.

The invention relates to a manufacturing process for alumina trihydrate with alkaline attack of bauxite using the Bayer process, comprising crushing followed by the attack of said crushed bauxite by bringing it into contact with a sodium aluminate liquor, the attack leading to the formation of a suspension which is treated to separate the insoluble residues from the sodium aluminate liquor, the aluminate liquor obtained in this way being then broken down and recycled as an attacking liquor after being separated from the alumina trihydrate precipitated during decomposition. The invention more particularly relates to a process making it possible to increase the productivity of the liquor during its decomposition The Bayer process, widely described in specialized literature, is the essential technique for the production of alumina to be transformed into aluminum by igneous electrolysis According to this process, the hot bauxite ore is attacked by means of an appropriately concentrated sodium aluminate liquor (attacking liquor), causing the alumina to become soluble in said aluminate liquor and giving a suspension made up of particles of ore which were not dissolved during the attack (unattacked residue or "red mud") in said sodium aluminate liquor In general, the suspension is diluted and the mud is separated from the aluminate liquor by decantation. Once it has been separated from this mud, the liquor is cooled down to a temperature at which it is in a highly unbalanced state of supersaturation. At this stage it is referred to as "supersaturated liquor". Alumina trihydrate particles are then sown with a view to causing the supersaturated liquor to "decompose", i.e. causing alumina to precipitate in the form of alumina trihydrate. Finally, the sodium aluminate liquor, depleted in alumina as a result of precipitation, called "decomposed liquor", is recycled and sent to the bauxite attack stage after being concentrated by evaporation and by a possible addition of sodium hydroxide.

It is well known that the processing conditions must be suited to the degree of hydration and the crystallographic structure of the alumina contained in the bauxite, and also to the nature and the content of the impurities which it contains. The bauxites containing alumina in the monohydrate state (boehmite, diaspore) are more difficult to attack than bauxite containing alumina in the trihydrate state and are treated using the Bayer process at temperatures higher than 200° C., generally ranging between 220 and 300° C. Bauxites containing alumina in the trihydrate state (gibbsite, hydrargillite) are treated at temperatures lower than 200° C. and generally ranging between 100 and 170° C. So whether bauxites are monohydrate or trihydrate, they are attacked under pressures that are in general higher than atmospheric pressure, the suspension resulting from the mixture of the crushed ore and the aluminate liquor passing, for example, through a succession of autoclaves or tubular heat exchangers. Pressure, often referred to in the following text, is expressed with practical, current units, namely the atmosphere or the bar, which each correspond to 100,000 pascals, or 100,000 newtons per square meter. It is additionally expressed as an absolute value: a pressure of 2 bar corresponds, for example, to an excess pressure of one bar approximately, in relation to atmospheric pressure, itself close to 1 bar.

The chief factors acting on the yield of the bauxite attack are the temperature and the concentration of sodium hydroxide or "free" caustic soda, i.e. likely to dissolve alumina. Caustic soda is frequently expressed by the basic group Na2O and the caustic soda concentration is given in grams of $Na_2O$ per liter (g $Na_2O$/l). In addition, the state of saturation or stability of the liquors is characterized by the weight ratio:

$$R_p = \frac{\text{dissolved } Al_2O_3 \text{ concentration (in g/l)}}{caustic Na_2O \text{ concentration (in g/l)}}$$

This weight ratio Rp, characteristic of the state of saturation of dissolved alumina in the liquor from the Bayer cycle, makes it possible to determine the productivity of the liquor as it breaks down This is defined by the amount of alumina restituted, in the form of alumina trihydrate, after decomposition of the supersaturated liquor, as a percentage of a given volume of supersaturated liquor. Productivity, expressed in kilograms of alumina per cubic meter of aluminate liquor (kg $Al_2O_3/m^3$), is obtained by multiplying the variation in the Rp before and after decomposition by the caustic soda concentration of the supersaturated liquor.

Whether the bauxites are monohydrate or trihydrate, the productivity of the decomposition is greater in proportion as the Rp ratio reached after attack is higher. However, the dilution and cooling that the suspension undergoes to facilitate liquid/solid separation, and the residence time of the liquor in the devices used to separate it from the insoluble residues (in general settling tanks) create conditions such that the risk of retrogradation is greater in proportion as the Rp is high. Retrogradation is a phenomenon to be avoided because it results in the premature precipitation of the alumina trihydrate, which, instead of being collected in the decomposition chain, mixes with the insoluble residues and is discharged with them. The risk of retrogradation therefore induces one to limit the value of the Rp so that the speed with which separation between the insoluble residues and the supersaturated aluminate liquor can be carried out greatly influences the yield and the productivity of the process.

In the early years of the alumina industry, separation of the insoluble residues was carried out by filtration, on a filter press. This technique is hardly ever used now except in exceptional cases, having given way to sedimentation, performed in continuous settlers. Separating the insoluble residues by settling enables large flows to be treated continuously at low operating costs. In general, settling is performed after dilution and cooling of the suspension which is brought to atmospheric pressure. However, the applicant has designed a device, described in U.S. Pat. No. 5,407,561, which makes it possible to settle a suspension injected under pressure, at a higher temperature. With such a device, the settling time is lower, which makes it possible to reduce the risk of retrogradation or, for the same amount of risk, to increase the targeted Rp after attack and therefore to increase the productivity of the liquor during decomposition.

After settling, and before it arrives in the decomposition chain, the supersaturated liquor, which typically still contains 100 to 300 mg/l of dry matter, generally undergoes filtration, called a safety filtration. For this, filters of the Kelly type are generally used. These filters, described in patent GB 179 355, are filters designed to equip the tanks inside which mobile metal frameworks support filter surfaces. The basic filtration principle involves making the liquid pass through a filter medium whose openings allow the liquid through, but retain the particles. As described in the original patent, the suspension is put through the filtration medium by gravity. But resistance to flow of the liquid, not only due to the filter medium itself but also to the layer of particles building up against it, a layer commonly referred to as a "cake", makes it necessary to pressurize the suspension, for example by means of pumps which consume energy in proportion to the pressure required. It is of course necessary to remove this cake cyclically when it reaches a certain thickness, so that its resistance has an acceptable mean value.

With the first models of Kelly filters, the cake was removed by opening the tanks and regularly dismantling the frames. Improvements have been made, for example by positioning the frames vertically and by using a means making it possible to peel off the cake which then falls under its own weight to the bottom of the filter tank, from where it is removed. These means may be mechanical, for example a means used to jolt the filter surfaces, or one or more liquid jets which strike the cake in several places or sweep its surface But, preferably, a backflow of liquid is used, sending part of the already filtered liquid, called "filtrate", back through the filter medium under pressure or simply by gravity. Devices such as those described in European patent EP 0 226 478 are today frequently used to carry out the safety filtration The filtration cake generally contains not only particles of insoluble residue coming from the bauxite but also insoluble products such as tricalcium aluminates or hydrogarnets resulting from the reaction of the aluminate liquor with lime or tricalcium aluminate hexahydrate, this last being generally used as a filtration additive injected upstream of the safety filter. The cake is either removed or re-used in the Bayer chain, as indicated in French patent FR 2 860 78, to reduce clogging in the heat exchangers.

Despite all the improvements already made to the Bayer process, the constant concern of the applicant is to develop a Bayer process for manufacturing alumina trihydrate by alkaline attack of bauxite which is increasingly efficient, and in particular which has the highest possible decomposition productivity with the lowest possible risk of retrogradation.

A first subject according to the invention is a Bayer process for manufacturing alumina trihydrate by alkaline attack of bauxite, in which the hot bauxite ore is attacked by means of a sodium aluminate liquor at a suitable concentration (attack liquor), causing the alumina to become soluble in said sodium aluminate liquor and obtaining a suspension comprising said liquor enriched with dissolved alumina and particles of ore which have not been dissolved during the attack (unattacked residue or "red mud"), the red mud being then separated from said sodium aluminate liquor, typically by settling, said aluminate liquor being placed in a highly unblanced state of supersaturation (supersaturated liquor), typically by so cooling and dilution, a process in which, after a filtration stage known as safety filtration, possibly including the addition of filtration additive(s), during which the concentration of insoluble particles of aluminate liquor is brought down to a value lower than 10 mg/l, alumina trihydrate particles are introduced into said supersaturated liquor with the aim of bringing about decomposition, i.e. the precipitation of alumina in the form of alumina trihydrate, and into which, after decomposition, the sodium aluminate liquor, depleted in alumina as a result of the precipitation ("decomposed liquor") is recycled and sent to the bauxite attack stage after being concentrated, typically by evaporation and possible addition of sodium hydroxide, said process being characterized in that, during said safety filtration stage, a filtering device is used including a zone in which the liquor is subjected, after going through said filtration medium to a pressure greater than 2 bar, and preferably greater than 3 bar. Preferably, to help the liquor to pass through the filtration medium, a higher pressure is applied upstream of said filtration medium. In this preferred alternative, said filtering device also includes a zone in which the liquor is subjected, before going through the filtration medium, to a pressure greater than 5 bar, preferably greater than 6, and typically dose to 7 bar.

By maintaining the liquor under pressure downstream of the safety filtration, as indicated in the process according to the invention, it becomes possible to bring the temperature of said liquor up to a higher temperature than the temperature usually used in prior art, which was close to 100° C. Here, depending on the pressure used, a temperature higher than 120° C., preferably higher than 130° C., and preferably still higher than 140° C. can be reached. With such a temperature and such a pressure, the equilibrium Rp associated with the aluminate liquor is higher than in prior art, so that the saturation rate of said liquor comes close to it, which, for the same residence time in the safety filtering device, exposes said liquor to a significantly lower risk of retrogradation.

By maintaining the risk of retrogradation at a level comparable with that which was accepted until now, it is possible to aim at a higher supersaturation rate than in prior art. Preferably, a suitable filtration additive is used which, by helping to achieve a shorter residence time of the liquor in the filtering device, makes it possible to target an even higher saturation rate. Advantageously, the filtration additive used for the safety filtration is selected from materials such as lime, tricalcium aluminates or wallastonite. The group of tricalcium aluminates comprises:

certain hydrogarnets, which are hydroxylated silicates of general formula $X_3Y_2(SiO4)_{3-x}(OH)_{4x}$, in which X=Ca and Y=Al; in the Bayer process, it is usual to represent these hydrogarnets by the following general formula:

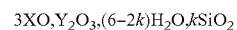

$3XO,Y_2O_3,(6-2k)H_2O,kSiO_2$ where X=Ca, Y=Al and where k lies between 0 and 3; the hydrogarnet corresponding to k=0 being tricalcium aluminate hexahydrate.

substituted hydrogarnets deriving from the previous family, for example by partial substitution of the calcium (up to 10% atomic) or of aluminum (up to 20% atomic) by another metal: the calcium may be replaced by iron (ferrous ion), manganese or magnesium; aluminum may be replaced by chromium or iron (ferric ion).

The applicant noted that it was possible to bring the rate of supersaturation Rp of the aluminate liquor up to a value greater than 1.25 without the risk of unwanted precipitation in the filtering device becoming prohibitive. When the temperature can be maintained at a value above 140° C., typically 140° C.-145° C., the saturation index Rp can be raised to a value close to 1.35, or even more. In this way, the process according to the invention, with a constant caustic concentration, makes it possible to obtain substantially improved decomposition productivity, of around 10 to 30%. As an indication, the caustic concentration of a sodium aluminate liquor designed to attack a bauxite rich in alumina present in the form of trihydrate is typically close to 120 g-170 g $Na_2O$/liter.

An additional advantage derives from the fact that the liquor is kept under pressure downstream of the safety filtration: it is possible, as we have seen, to filter a liquor at a higher temperature than 120° C., preferably higher than 130° C., preferably still higher than 140° C., which makes it possible to have a much less viscous liquor than in prior art. This lower viscosity enables a significant increase in the filtration rate and a reduction in resistance to the flow per unit of area of the filtration medium. It is therefore possible, for an equivalent level of performance, to decrease the filter surface, or even the number of filtering devices at the level of the safety filtration.

In practice, as the temperature of optimal dissolution of hydrargillite is close to 155° C., there is little point in raising the temperature to a value significantly higher than 160° C., because this would require a pressure before filtration higher than approximately 9 bar to be applied. In this way, for Bayer circuits designed to treat bauxites primarily containing alumina in the form of trihydrate, a device is used according to the invention that comprises a zone in which the liquor is subjected, before it goes through the filtration medium, to pressure ranging between 5 and 9 bar, preferably between 6 and 8 bar, and typically close to 7 bar, and a zone in which the liquor is subjected, after going through said filtration medium to pressure ranging between 2 bar and 6 bar, preferably ranging between 3 and 5 bar.

However, for bauxites rich in alumina present in the form of monohydrate (boehmite, diaspore), the upper pressure and temperature limits indicated above may be exceeded.

But another practical limitation is imposed on the temperature by the behavior of the material making up the filtration medium, for which the conditions of use are particularly demanding: the material must not only have good mechanical characteristics at the application temperature but it must also be able to withstand the aggressive alkaline medium. Moreover, the very fine solid particles quickly stop up the pores of the filtration medium making it impossible to clean effectively. The applicant noted that it was preferable to replace the filtration medium conventionally used in the safety filtration of prior art, typically a non-woven, perforated polypropylene fabric, by a medium chosen from the polyamides (PA), in particular aromatic polyamides (aramids), polyvinylidene fluoride (PVDF), polytetrafluoroethylene (PTFE) and, preferably, phenylene polysulfide (PS). Advantageously, this medium takes the form of a fabric made of one of these materials, not woven and perforated, well suited to being immersed in an alkaline medium with a high caustic concentration brought to high temperature.

To maintain the sodium aluminate liquor at such pressures during the safety filtration, at least one device is advantageously used comprising a tank, a filtration medium and at least two zones separated by said filtration medium, the liquor being introduced, before filtration, into the first zone and passing, after filtration, into the second zone. Said device also includes means designed to peel off the filtration cake from the filtration medium in the first zone, while the sodium aluminate liquor remains at a pressure greater than 2 bar.

In former practice, the safety filtration included several filters that generally operated in parallel, so that one of them could easily be taken out of the circuit for removal of the filtration cake and cleaning of the filtration medium (dismantling). Dismantling was performed at atmospheric pressure. Here, in the context of the invention, it is not enough to isolate the filtering device from the Bayer circuit during dismantling because the latter must be carried out at a pressure at least greater than 2 bar, and preferably at least greater than 3 bar, in order to avoid unwanted alumina trihydrate precipitation on the filtration medium. Such precipitation would quickly make the parts of the filtering device which are in contact with said liquor, namely the filter frames, liquor inlet and outlet pipes, the internals and, obviously, the filtration medium itself, unsuitable for any later use.

Several means may be envisaged for removing the filtration cake from the filtration medium, but all must make removal possible in a filtering device maintained under pressure. The following may be considered:

a) a scraper moving, by translation or rotation, parallel to the surface of the filtration medium, which may operate discontinuously, depending on the thickness reached by the cake and on the resultant resistance to the flow, or which may operate continuously, in conjunction with a continuous suction system, for example placed inside the filtering device itself, as suggested in EP 0 382 202;

b) a system including several valves laid out on the liquor inlet and outlet pipes which allow the filtering device to be isolated in relation to the Bayer circuit and to the outside subjected to atmospheric pressure, the aluminate liquor trapped in the isolated circuit being then made to circulate in order to clean the filtration medium. For this the following can be used:

b1) either a secondary pump which is started up after isolating the filtering device to send the liquor through said filtration medium against the current, or to spray it in the form of violent jets on the surface of the cake;

b2) or a filtered liquor storage device placed above the filtering device: when the latter is isolated and the feed pump no longer operates, the liquor stored in this storage device goes back down by gravity towards the filtration medium and passes through it against the current, removing and carrying away the remains of the filtration cake. An installation similar to that described in EP 0.226.478 can be used to implement this method, with the difference that the removal tank for the remains of the cake must not be at atmospheric pressure.

The means designed to remove the detached fragments of cake from the filtration medium may be of several kinds. However, whether peeled off continuously or discontinuously, the fragments of cake from the filtration medium, which take the form of a fairly homogeneous mud, before being removed and brought to atmospheric pressure, are extracted from the filtering device by being entrained in a removal pipe, one end of which is connected to said first zone and the other end is connected to a mud removal device Advantageously, said removal pipe is provided with a valve which makes it possible to isolate the filtering device from the removal device for the mud coming from the filtration cake.

The device for removing mud coming from the filtration cake may take several forms, depending on the devices existing on the Bayer circuit under consideration. For example, if, upstream of the safety filtration, a pressurized settling tank of the type described in U.S. Pat. No. 5,407,561 is fitted, it appears advantageous to connect the pipe for removing the fragments of filtration cake to the pipe which supplies the pressurized settling tank with the suspension, or, preferably, to the red mud removal system located on the underflow of said pressurized settling tank. But it is also possible, particularly when the Bayer chain comprises conventional settling tanks at atmospheric pressure, to connect said pipe for removing the mud from the filtration cake to a sump. Said sump may:

either be separated from the filtering device, from time to time, at tithes chosen depending on how full the sump is: a valve placed on the removal pipe is dosed, in order to bring the sump temporarily to atmospheric pressure then empty it of its contents by gravity or by using an extractor;

or communicate with an extraction device, typically an extractor in the form of a vessel including a bore in which a worm feeder or a wing drum rotates, intermittently or continuously, the end of the thread or the wings being in close contact with the wall of said bore, said extractor having an input zone communicating with said sump and an output zone communicating with the outside, sealing being such that, as long as the extractor vessel is filled with mud, there is no direct communication with the atmospheric pressure so that sufficient pressure, typically greater than 2 bar, can be maintained permanently within the sump. Obviously, a safety valve may also be placed on the removal pipe in order to protect the filtering device from any risk of pressure drop in the sump.

In the process according to the invention, the safety filtration can always be carried out with several filtering devices operating in parallel, so that one of them can easily be taken out of the Bayer circuit for dismantling, but said dismantling must be performed at a pressure greater than atmospheric pressure, typically greater than 2 bar, and preferably 3 bar.

Obviously, both the first zone and the second zone are designed as vessels that work constantly under pressure. The aluminate liquor must, at the filtration outlet, remain subjected to a pressure always greater than 2 bar, even when peeling off and removing the filtration cake, operations which are carried out in the first zone. The first zone is connected to two pipes, an inlet pipe for the aluminate liquor under pressure and a pipe for removing the filtration cake. The second zone is connected to an outlet pipe for the aluminate liquor under pressure which is directed downstream to a device for pressure relief, cooling and dilution, prior to decomposition.

In a preferred method of the invention, upstream of the safety filtration, the aluminate liquor is separated from red mud by settling under pressure. For this, a pressurized settling device is used comprising:
 a container with an extended cylindrical wall, a closed upper end and a conical lower part designed to receive the solid particles;
 an agitator assembled so as to rotate along an inner surface of the lower part;
 a discharge device assembled under the lower part, comprising at least one opening and an underflow pump to remove the settled solids without any loss of pressure in the apparatus;
 at least one means of detection for detecting the level of the solids reached in the apparatus without substantially disturbing the deposit of the solids, and
 a feed pipe to receive the incoming flow of a pressurized suspension, said feed pipe having an opening above the level of the settled solids in the apparatus.

Advantageously, said suspension is settled in a pressurized settling tank, such as that described above, while being maintained at a temperature greater than 120° C., preferably higher than 130° C., typically at a temperature ranging between 140° C. and 170° C., preferably close to 160° C., and the overflow of said pressurized decanter is led, with or without cooling, to said safety filtering device. As indicated above, the device for removing mud coming from the filtration cake includes a removal pipe which can be connected to the feed pipe which makes it possible to receive the incoming flow of a pressurized suspension in said pressurized settling tank, or, preferably, in, or in the vicinity of, the underflow of said pressurized settling tank, the settled solids being removed by said discharge device assembled under the lower part of the pressurized settling tank. Obviously, it is advantageous to aim for a connection point for the filtration cake removal pipe on the mud removal circuit of the pressurized settling tank which corresponds to a pressure slightly lower than that prevailing in the first zone of the safety filtering device.

The means designed to remove the liquor from the filter after filtration through the filtration medium may be of several kinds. The aluminate liquor moves continuously through the filtration medium but it can be stopped temporarily during the cake peeling cycles. Once they have been peeled off, the debris can be evacuated from the filtering device and extracted from the circuit intermittently or continuously. However, whether extracted continuously or discontinuously, the liquor filtered through the filtration medium, which takes the form of a liquor containing a very small quantity of solid particles, before being removed and brought to atmospheric pressure, is extracted from the filtering device by being entrained in a removal pipe, one end of which is connected to said first zone and the other end is connected to a removal device. Advantageously, said removal pipe is provided with a valve which makes it possible to isolate the filtering device from the removal device for the filtered liquor. Like the cake, this filtered liquor must be extracted by maintaining a pressure greater than atmospheric pressure, typically greater than 2 bar, preferably 3 bar.

The device for removing the liquor coming from the filtration stage may take several forms, depending on the devices existing on the Bayer circuit under consideration. For example, the liquor extracted under pressure may be cooled at a temperature lower than boiling point at atmospheric pressure, typically a temperature lower than 100° C., and preferably lower than 80° C., for example by means of a liquid/liquid heat exchanger, the pressure being maintained throughout this cooling process. The liquor is then reduced in pressure to bring it back to atmospheric pressure using, for example, a regulation valve or an opening made in the wall of the piping in which said aluminate liquor circulates.

Also, provision could be made to connect said pipe for removing the liquor coming from filtration to a sump. Said sump may:
 either be separated from the filtering device, from time to time, at times chosen depending on how full it is: a valve placed on the removal pipe is closed, in order to bring the sump temporarily to atmospheric pressure then empty it of its contents by gravity or by using an extractor;
 or communicate with an extraction device operating intermittently or continuously, typically an extractor in the form of a vessel including a bore in which a worm feeder or a wing drum rotates, the end of the thread or the wings being in close contact with the wall of said bore, said extractor having an input zone communicating with said sump and an output zone communicating with the outside, sealing being such that, as long as the extractor vessel is filled with liquor, there is no direct communication with the atmospheric pressure so that sufficient pressure, typically greater than 2 bar, can be maintained permanently within the sump. Obviously, a safety valve may also be placed on the removal pipe in order to protect the filtering device from any risk of pressure drop in the sump.

EXAMPLE OF EMBODIMENT (FIGURE)

The FIGURE schematically illustrates a Bayer cycle improved according to the invention, in which bauxite 10 is crushed by wet grinding (B), here in the presence of an aliquot L2 of the attack liquor L0. An aliquot L1 which represents most of the attack liquor of L0, typically more than 80%, is not sent to the bauxite wet grinding It is added to the suspension S1 deriving from the wet grinding to obtain a suspension S10 which is preheated in a pre-heating chain (C). The suspension S100 preheated in this way is introduced into the attack chain (A). Attack is carried out under pressure at 160° C. The attack chain takes the form of a series of autoclaves in which the suspension is to circulate. At the end of the attack process, the suspension passes through heat exchangers which, for example, take part in the pre-heating of the suspension before attack. At the end of the attack process, during the optional stage (D1), the pressure is reduced to a value p' greater than atmospheric pressure, typically close to 4 atmospheres. Suspension S2, whose temperature has dropped to 145° C., is sent to a liquid/solid separation device (DP), typically a settling tank under pressure in which the insoluble residues are separated from the liquor by gravitation: the insoluble residues are removed in the form of red mud 20 passing through an extractor 300 while the overflow 13, still containing some particles—its content of dry matter is about a hundred mg/l—is sent to the filtration (F), called "red filtration" or "safety filtration". By means of a pump 200, the overflow is sent to the safety filtration at a pressure of around to 6-7 atmospheres. The filtrate L4 is a supersaturated aluminate liquor whose pressure is brought down to atmospheric pressure during stage (D2), where it is initially cooled to a temperature lower than 80° C. by means of a liquid/liquid heat exchanger, pressure being maintained at a value close to 6 bar, and then where its pressure is relieved to bring it back down to atmospheric pressure using a regulation valve (not shown). The liquor 4 at atmospheric pressure is sent to the decomposition chain (DC) where it is cooled to precipitate the alumina trihydrate 30.

On leaving decomposition chain (DC), the depleted liquor L5 is concentrated by evaporation (E) and is then sent back to the attack stage (attack liquor L0).

Tricalcium aluminate hexahydrate is used as a filtration additive 100 to the safety filtration F. The supersaturated liquor comes from the overflow of the settling tanks and still contains a certain amount of solid particles. These generally turn out to be very sticky and in order not to block the filter screen a filtration additive is added which modifies the physical and chemical behavior of these fine particles. Lime or tricalcium aluminate is generally used, in particular tricalcium aluminate hexahydrate. In this example, tricalcium aluminate hexahydrate 100 is fed in, upstream of pump 200, at a rate of 0.95 g CaO per liter of liquor.

At the level of the safety filtration F, the temperature of the aluminate liquor is 3; close to 140° C., so that a supersaturated liquor L'3 with a saturation index Rp of 1.35 can be filtered. Without the device according to the invention, safety filtration can be performed only with the aluminate liquor at atmospheric pressure as it leaves the filter, so that the temperature of the liquor, at the level of the safety filter, cannot be greater than a value close to 105° C., corresponding to the boiling point of the liquor at atmospheric pressure. At such a temperature, it is not possible to make an aluminate liquor with an Rp greater than 1.25 pass through the safety filter without risking heavy precipitation of alumina hydrate on the filtration medium. In contrast, by keeping the liquor under pressure after filtration, it is possible to maintain it at a temperature significantly greater than 105° C., such a temperature as to make it possible to filter a liquor with a high Rp without risk of unwanted precipitation onto the filtration medium. In fact, in prior art, even though just after attack, the liquor could already reach a high Rp, close to 1.35, it was necessary, in order to limit the risks of unwanted precipitation, to dilute said liquor before it went through the safety filtration ("dilute" here means to decrease the Rp by increasing the caustic soda content, for example by adding attack liquor or a liquor with a lower Rp).

The filtration cake 111 so formed is removed from the filter and eliminated, in the form of mud with a dry matter content of around 500 g/l, to a sump 400. A valve 410 is used to separate the sump 400 from the filtering device (F). When the sump is full, the valve 410 located on the removal pipe is closed, in order to bring the sump temporarily to atmospheric pressure and then to empty it of its contents by gravity.

The invention claimed is:

1. A manufacturing process for alumina trihydrate by alkaline attack of bauxite, following the general stages of the Bayer process, the process comprising:
    a) attacking bauxite ore by means of a sodium aluminate liquor at a suitable concentration, thereby causing alumina within the bauxite ore to become soluble in said sodium aluminate liquor and obtaining a suspension including said liquor enriched with dissolved alumina and red mud formed of particles of ore which were not dissolved during the attack;
    b) separating the sodium aluminate liquor from said red mud;
    c) placing said sodium aluminate liquor in a highly unbalanced state of supersaturation to form a supersaturated liquor;
    d) introducing alumina trihydrate particles into said supersaturated liquor, causing decomposition of the supersaturated liquor, and causing alumina to precipitate in the form of alumina trihydrate;
    e) after decomposition, concentrating the sodium aluminate liquor, depleted in alumina as a result of precipitation, and
    f) recycling said liquor to the bauxite attack stage a),
    said process during which, between stage b) and stage c), the aluminate liquor undergoes safety filtration, so that on leaving the filtration stage, the aluminate liquor contains less than 10 mg/l of insoluble particles,
    said process being characterized in that, during said safety filtration stage, a filtering device is used including a zone in which the liquor is subjected, after going through a filtration medium, to a pressure greater than 2 bar.

2. A process according to claim 1 characterized in that said filtering device also includes a zone in which the liquor is subjected, before going through the filtration medium, to a pressure greater than 5 bar.

3. A process according to claim 1 characterized in that, during said safety filtration, the aluminate liquor is at a temperature greater than 120° C.

4. A process according to claim 1 in which, during said safety filtration, a filtration additive is injected into the aluminate liquor.

5. A process according to claim 4 in which said filtration additive belongs to the group consisting of lime, tricalcium aluminates and wallastonite.

6. A process according to claim 1 in which the filtering device includes a zone in which the liquor is subjected, before going through the filtration medium, to a pressure ranging between 5 and 9 bar, and a zone in which the liquor is subjected, after going through said filtration medium, to a pressure ranging between 2 and 6 bar.

7. A process according to claim 1 in which the filtering device includes the filtration medium made from a material selected from a group consisting of: polyamides, polyvinylidene fluoride, polytetrafluoroethylene and phenylene polysulfide.

8. A process according to claim 1 in which, during said safety filtration, at least one filtering device is used comprising a tank, the filtration medium and at least two zones separated by said filtration medium, the liquor being introduced, before filtration, into a first zone and passing, after filtration, into a second zone, said device also including means designed to peel off filtration cake from the filtration medium in the first zone, while the sodium aluminate liquor remains at a pressure greater than 2 bar.

9. A process according to claim 8 in which said means designed to peel off the filtration cake from the filtration medium include a scraper which moves, by translation or rotation, parallel to the surface of the filtration medium, and able to function discontinuously, depending on the thickness reached by the cake, or able to function continuously, in conjunction with a continuous suction system.

10. A process according to claim 8 in which said means designed to peel off the filtration cake from the filtration medium comprise a system including several valves laid out on the liquor inlet and outlet pipes which allow the filtering device to be isolated from the Bayer circuit and from the outside subjected to atmospheric pressure, the aluminate liquor trapped in the isolated circuit being then made to circulate in order to clean the filtration medium.

11. A process according to claim 10 in which said aluminate liquor is made to circulate using a secondary pump which is started up after isolating the filtering device to send the liquor through said filtration medium against the current, or to spray it in the form of violent jets on the surface of the cake.

12. A process according to claim 10 in which said liquor after filtration passes through a storage device placed above the filtering device, so that, when the filtering device is isolated and the feed pump no longer operates, the liquor stored in the storage device goes back down by gravity towards the filtration medium and passes through the filtration medium against the current, removing and carrying away remains of the filtration cake.

13. A process according to claim 8, in which the fragments of cake removed from the filtration medium are extracted from the filtering device and entrained into a removal pipe, one end of which is connected to said first zone and the other end is connected to a device for removing mud coming from said cake.

14. A process according to claim 13 in which said removal pipe is provided with a valve which makes it possible to isolate the filtering device from the removal device for the mud coming from the filtration cake.

15. A process according to claim 14 in which said device for removing the mud coming from the filtration cake includes a sump, which may be separated from said filtering device from time to time, at times chosen depending on how full said sump is, by closing said valve located on the removal pipe, in order to bring the sump temporarily to atmospheric pressure then to empty it of its contents by gravity or by means of an extractor.

16. A process according to claim 13 in which said device for removing the mud coming from the filtration cake includes a sump that communicates with an extraction device operating intermittently or continuously, comprising an extractor with an input zone communicating with said sump and an output zone communicating with the outside, sealing of said extractor being such that, as long as the extractor is filled with mud, there is no direct communication with the atmospheric pressure so that sufficient pressure can be maintained permanently within the sump.

17. A process according to claim 1 in which, during stage b), said aluminate liquor is separated from the red mud by settling under pressure.

18. A process according to claim 17 in which a pressurized settling tank is used, including:
 a container with an extended cylindrical wall, a closed upper end and a conical lowerpart designed to receive the solid particles;
 an agitator assembled so as to rotate along an inner surface of the lower part;
 a discharge device assembled under the lower part, comprising at least one opening and an underflow pump to remove settled solids without any loss of pressure in the apparatus;
 at least one means of detection for detecting the level of the solids reached in the apparatus without substantially disturbing the deposit of the solids, and
 a feed pipe to receive the incoming flow of a pressurized suspension, said feed pipe having an opening above the level of the settled solids in the apparatus.

19. A process according to claim 17 in which the suspension is settled in a settling device under pressure at a temperature greater than 120° C., and in which overflow from a pressurized settling tank is sent to said filtering device.

20. A process according to claim 18 further including a device for removing mud from a filtration cake derived from the filtration medium, which includes a removal pipe which is connected to the feed pipe which makes it possible to receive the incoming flow of a pressurized suspension into said pressurized settling tank.

21. A process according to claim 17 in which, during said safety filtration, at least one filtering device is used comprising a tank, the filtration medium and at least two zones separated by said filtration medium, the liquor being introduced, before filtration, into a first zone and passing, after filtration, into a second zone, said device also including means designed to peel off filtration cake from the filtration medium in the first zone, while the sodium aluminate liquor remains at a pressure greater than 2 bar, in which the fragments of cake removed from the filtration medium are extracted from the filtering device and entrained into a removal pipe, one end of which is connected to said first zone and the other end is connected to a device for removing mud coming from said cake, and in which said device for removing the mud coming the filtration cake includes another removal pipe which is connected to a mud removal circuit of said pressurized settling tank, the settled solids being removed by said underflow pump, the point of connection on said mud removal circuit being chosen so that the pressure at the mud removal circuit is slightly lower than that in the first zone of the safety filtering device.

22. A process according to claim 8 in which the liquor, after filtration and before being removed and brought to atmospheric pressure, is extracted from the filtering device by being entrained in a removal pipe, the first end of which is connected to said first zone and the other end is connected to a removal device.

23. A process according to claim 22 in which said removal pipe is provided with a valve which makes it possible to isolate the filtering device from the removal device for the filtered liquor.

24. A process according to claim 22 in which aluminate liquor leaving the filtering device, while being kept under pressure, is cooled to a temperature lower than its boiling point at atmospheric pressure, by means of a liquid/liquid heat exchanger, then the pressure of said aluminate liquor is reduced until it reaches atmospheric pressure, using a regulation valve or an opening made in the wall of the pipe in which said aluminate liquor circulates.

25. A process according to claim 1 in which a filtration additive is injected into the aluminate liquor upstream of said filtering device.

26. A process according to claim 25 in which said filtration additive belongs to the group consisting of lime, tricalcium aluminates and wallastonite.

* * * * *